(12) United States Patent  (10) Patent No.: US 9,016,431 B2
Barnett  (45) Date of Patent: Apr. 28, 2015

(54) LOAD BALANCING DESCENDING DEVICE

(75) Inventor: Tracy Barnett, Fuquay Varina, NC (US)

(73) Assignee: Great Trango Holdings, Inc., Louisville, CO (US)

( * ) Notice: Subject to any disclaimer, the term of this patent is extended or adjusted under 35 U.S.C. 154(b) by 488 days.

(21) Appl. No.: 12/924,909

(22) Filed: Oct. 7, 2010

(65) Prior Publication Data

US 2014/0054109 A1  Feb. 27, 2014
US 2014/0166395 A2  Jun. 19, 2014

Related U.S. Application Data

(63) Continuation-in-part of application No. 11/445,499, filed on Jun. 1, 2006.

(60) Provisional application No. 60/687,234, filed on Jun. 3, 2005.

(51) Int. Cl.
| | |
|---|---|
| *A62B 1/16* | (2006.01) |
| *A62B 1/14* | (2006.01) |
| *E06C 7/00* | (2006.01) |
| *A47C 16/04* | (2006.01) |
| *E06C 7/18* | (2006.01) |
| *A01M 31/02* | (2006.01) |

(52) U.S. Cl.
CPC . *A62B 1/14* (2013.01); *E06C 7/006* (2013.01); *A47C 16/04* (2013.01); *E06C 7/185* (2013.01); *E06C 7/182* (2013.01); *A01M 31/02* (2013.01)

(58) Field of Classification Search
CPC ............ A62B 1/14; A62B 1/02; A62B 35/04; F16F 9/12
USPC ............ 182/5, 191–193; 188/290, 65.1, 65.5, 188/65.4
See application file for complete search history.

(56) References Cited

U.S. PATENT DOCUMENTS

| | | | | |
|---|---|---|---|---|
| 946,588 | A * | 1/1910 | Thuener | 188/65.4 |
| 3,814,210 | A * | 6/1974 | Hoffman | 182/6 |
| 3,876,036 | A * | 4/1975 | Sweet | 182/18 |
| 4,399,889 | A * | 8/1983 | Todd | 182/6 |
| 4,494,629 | A * | 1/1985 | Raeburn | 188/65.5 |

(Continued)

*Primary Examiner* — Katherine Mitchell
*Assistant Examiner* — Candace L Bradford
(74) *Attorney, Agent, or Firm* — Lathrop & Gage LLP

(57) ABSTRACT

A load balancing descending device for controlling the descent of a user descending on a rope carrying a load is provided. The rope has a decreasing rope free end as the user descends. The load balancing descending device comprises a first plate and a second plate. A first pin is positioned between the first plate and the second plate with the first pin spacing the first plate from and pivotally connecting the first plate to the second plate and the combined first plate and second plate having a first side and a second side. A second pin is positioned between the first plate and the second plate with the second pin spaced from the first pin. An attachment mechanism is formed in the first side of the combined first plate and second plate for attaching a user and/or load. The rope is wrapped in a serpentine manner about the first pin and the second pin between the first plate and the second plate with the rope free end exiting the combined first plate and second plate from the second side. As the user descends the rope, the length and weight of the rope free end decreases thereby causing the load balancing descending device to rotate moving the rope free end in a general direction from the first side toward the second side and automatically balancing the weight of the user and load against the weight of the rope free end in order to maintain a controlled rate of descent.

7 Claims, 12 Drawing Sheets

(56) References Cited

U.S. PATENT DOCUMENTS

| | | | |
|---|---|---|---|
| 4,580,658 A * | 4/1986 | Brda | 182/5 |
| 4,596,314 A * | 6/1986 | Rogelja | 188/65.5 |
| 5,845,894 A * | 12/1998 | Petzl et al. | 254/391 |
| 6,009,977 A * | 1/2000 | Pelofi | 182/192 |
| 6,029,777 A * | 2/2000 | Rogelja | 182/193 |
| 6,378,650 B2 * | 4/2002 | Mauthner | 182/5 |
| 6,446,753 B1 * | 9/2002 | Novak | 182/193 |
| 7,845,467 B2 * | 12/2010 | Petzl et al. | 182/5 |
| 2006/0207829 A1 * | 9/2006 | Mauthner | 182/5 |
| 2008/0245611 A1 * | 10/2008 | Klingler | 182/6 |
| 2008/0302600 A1 * | 12/2008 | Murray | 182/5 |
| 2009/0120720 A1 * | 5/2009 | Arms | 182/193 |
| 2012/0111665 A1 * | 5/2012 | Paglioli | 182/5 |
| 2014/0054109 A1 * | 2/2014 | Barnett | 182/5 |

* cited by examiner

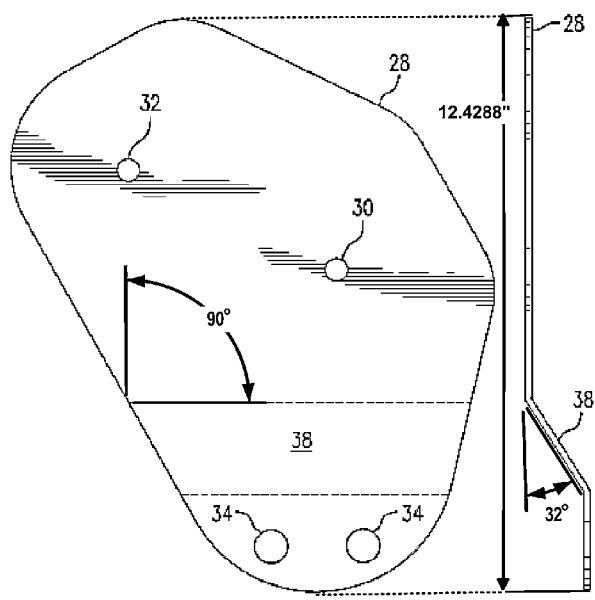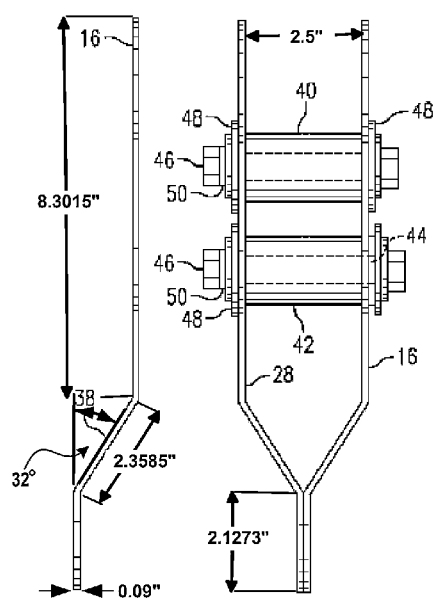
FIG. 11A    FIG. 11B    FIG. 11C    FIG. 11D

LOAD BALANCING DESCENDING DEVICE

The present application is a continuation-in-part of pending U.S. patent application Ser. No. 11/445,499, filed Jun. 1, 2006, entitled "Fast Rope Descending Device", which claims benefit of priority of U.S. Provisional Patent Application Ser. No. 60/687,234, filed Jun. 3, 2005, entitled "Fast Rope Descending Device".

BACKGROUND OF THE INVENTION

1. Field of the Invention

The present invention relates to a load balancing descending device and, more particularly, it relates to a load balancing descending device for controlling the descent of a user.

2. Description of the Prior Art

Soldiers who descend from helicopters into combat zones do not have the luxury of using standard rappel devices to control their rate of descent. It takes too long to engage and disengage the devices, the ropes are so thin that they get sucked into the helicopter's rotors and they typically allow only one soldier on the rope at a time. Additionally, the ropes typically apply friction in proportion to the amount of rope between the device and the ground. As the descending soldier approaches the ground there is less friction through the device because there is less rope weight and it becomes difficult to control the rate of descent. The currently accepted method is for the soldiers to slide down a roughly braided rope, approximately 50 mm in diameter, in the same manner as a fireman sliding down a pole. The technique is called fast-roping and requires no special equipment or devices. While this works well for a single soldier and his personal gear, it does not work when the soldier has an additional load such as a medical kit, a crew-served weapon, a canine unit, or other heavy equipment.

Accordingly, there exists a need for a load balancing descending device which automatically adjusts the amount of friction applied to the rope based on the combined weight of the soldier and his load. Additionally, a need exists for a load balancing descending device which automatically balances the weight of the soldier and his load against the weight of the free end of the rope in order to maintain a controlled rate of descent. Furthermore, there exists a need for a load balancing descending device which is easy to engage and disengage and allows a user to control the rate of descent with one hand.

SUMMARY

A load balancing descending device for controlling the descent of a user descending on a rope carrying a load is provided. The rope has a decreasing rope free end as the user descends. The load balancing descending device comprises a first plate and a second plate. A first pin is positioned between the first plate and the second plate with the first pin spacing the first plate from and pivotally connecting the first plate to the second plate and the combined first plate and second plate having a first side and a second side. A second pin is positioned between the first plate and the second plate with the second pin spaced from the first pin. An attachment mechanism is formed in the first side of the combined first plate and second plate for attaching a user and/or load. The rope is wrapped in a serpentine manner about the first pin and the second pin between the first plate and the second plate with the rope free end exiting the combined first plate and second plate from the second side. As the user descends the rope, the length and weight of the rope free end decreases thereby causing the load balancing descending device to rotate moving the rope free end in a general direction from the first side toward the second side and automatically balancing the weight of the user and load against the weight of the rope free end in order to maintain a controlled rate of descent.

In addition, the present invention includes a method for controlling the descent of a user descending on a rope carrying a load. The rope has a decreasing rope free end as the user descends. The method comprises providing a first plate, providing a second plate, positioning a first pin between the first plate and the second plate, spacing the first plate from the second plate, pivotally connecting the first plate to the second plate with the combined first plate and second plate having a first side and a second side, positioning a second pin between the first plate and the second plate, spacing the second pin from the first pin, attaching a user and/or load to the first side of the combined first plate and second plate, wrapping the rope in a serpentine manner about the first pin and the second pin between the first plate and the second plate, exiting the rope free end of the combined first plate and second plate from the second side, descending the rope such that the length and weight of the rope free end decreases, rotating the load balancing descending device, moving the rope free end in a general direction from the first side toward the second side, and automatically balancing the weight of the user and load against the weight of the rope free end in order to maintain a controlled rate of descent.

BRIEF DESCRIPTION OF THE DRAWINGS

FIGS. 11*a*-11*d* are elevational side views and end views illustrating the load balancing descending device, constructed in accordance with the present invention;

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENTS

As illustrated in FIGS. 1-13, the present invention is a load balancing descending device, indicated generally at 10, for use with large ropes 12, such as found in military operations. As a user descends using the load balancing descending device 10, the load balancing descending device 10 gradually slows the descent by rotating as the length and weight of the free rope 14 decreases. The load balancing descending device 10 of the present invention can be used by military personnel, climbers, and others during any type of climbing activity including, but not limited to, military operations, mountaineering, rock climbing, safety descents during emergencies and rescues, etc. Other uses for the load balancing descending device 10 not specifically set forth herein are also within the scope of the present invention. It should also be noted that the load balancing descending device 10 can be used with small ropes, also.

The load balancing descending device 10 of the present invention is preferably constructed from a steel material, however, constructing the load balancing descending device 10 from other rigid, durable materials is within the scope of the present invention.

Figure 2:
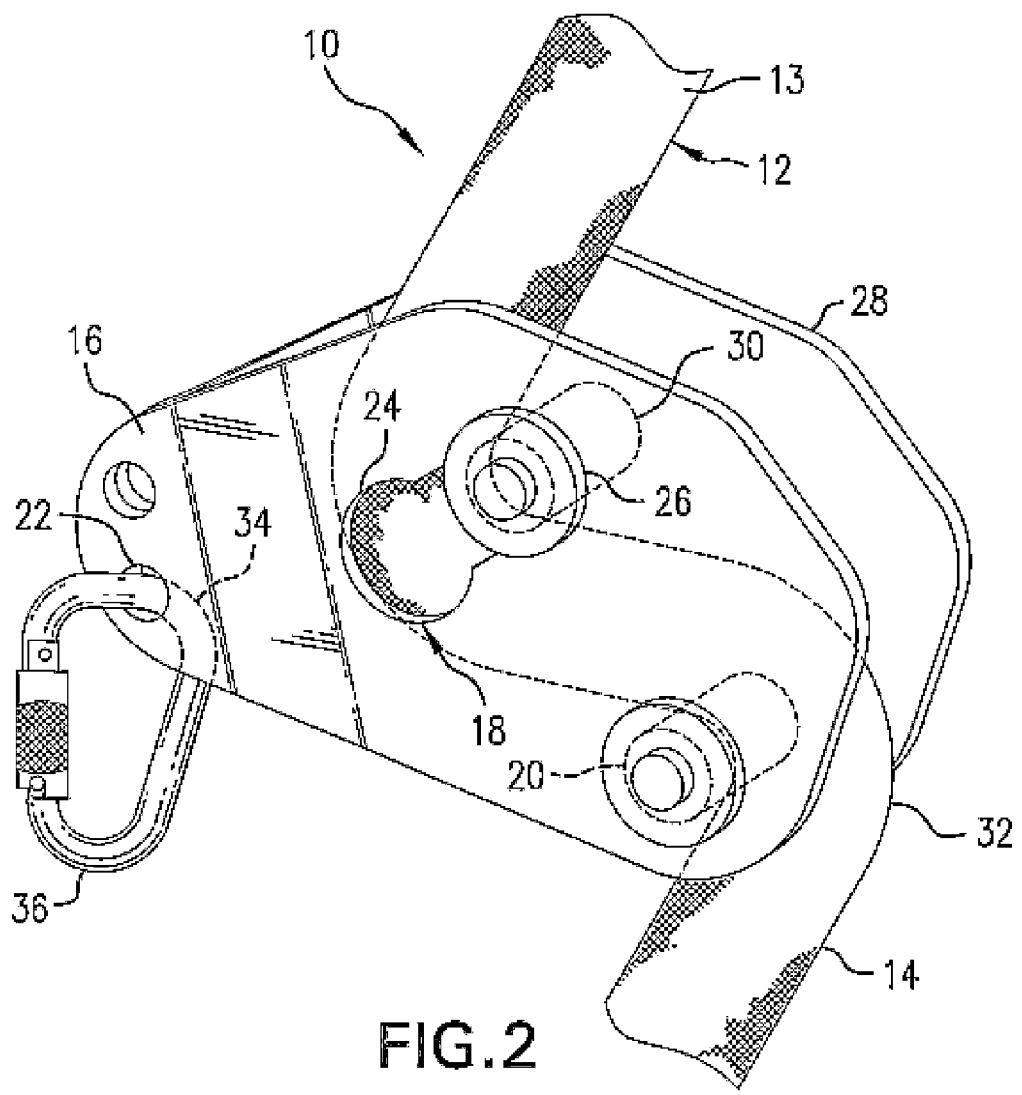
FIG. 2 is a perspective view illustrating the load balancing descending device of FIG. 1, constructed in accordance with the present invention.
Figure 3:
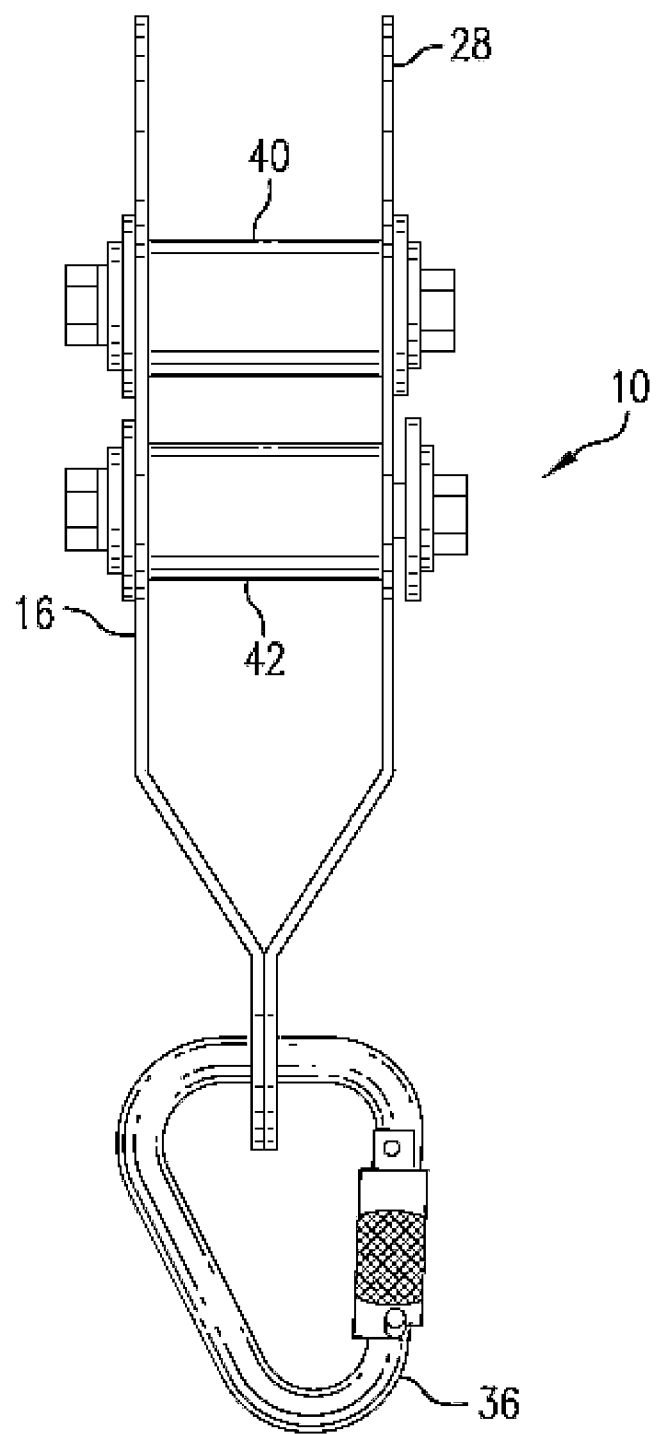
FIG. 3 is an elevational side view illustrating the load balancing descending device of FIG. 1, constructed in accordance with the present invention.
Figure 4A:
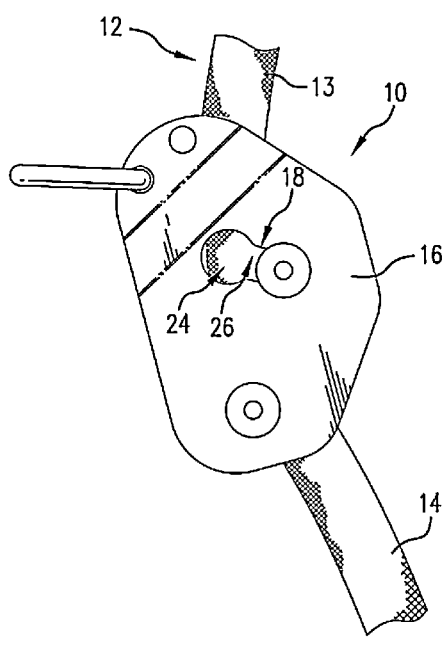
FIGS. 4*a* and 4*b* are photos illustrating the load balancing descending device of FIG. 1, constructed in accordance with the present invention, with the load balancing descending device in use by a user.
Figure 4B:
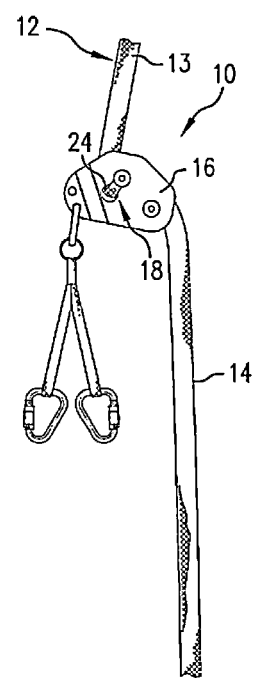
Figure 5:
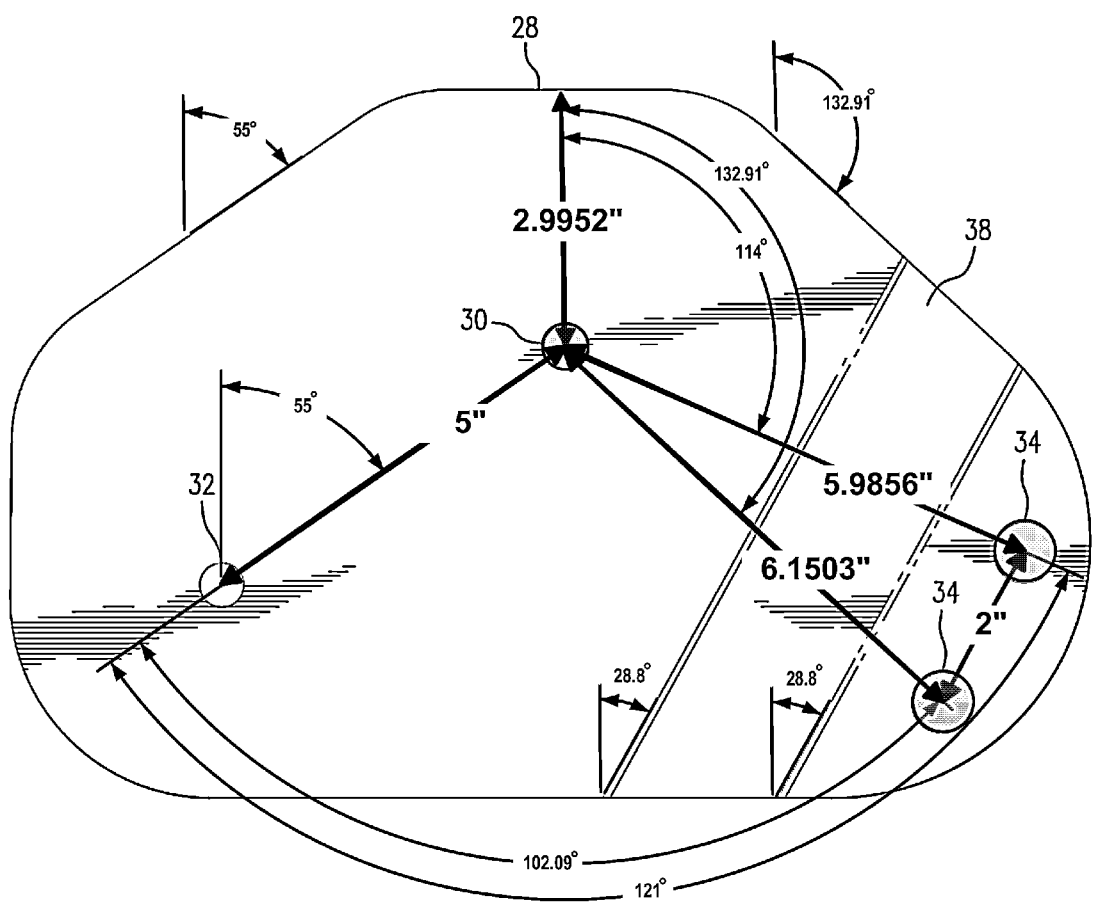
FIG. 5 is an elevational side view illustrating the left side of the load balancing descending device, constructed in accordance with the present invention.
Figure 6:
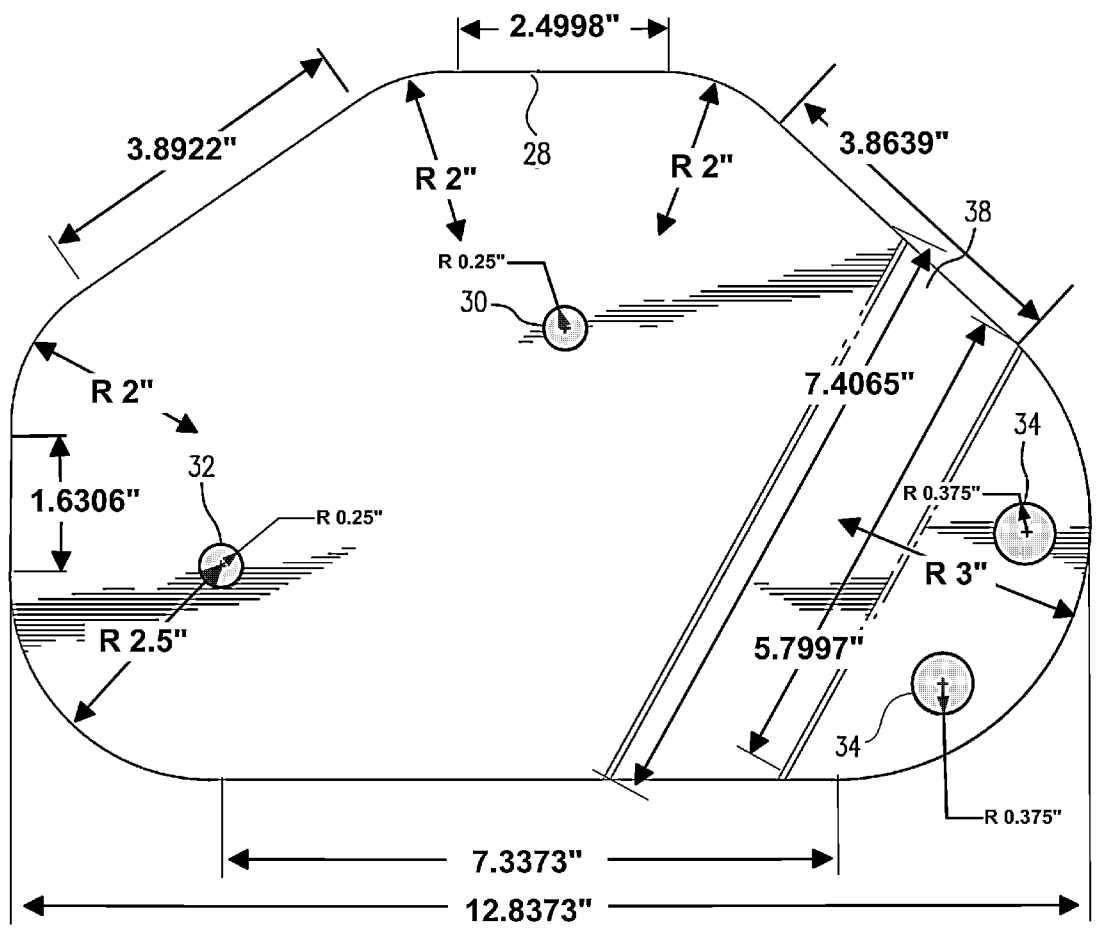
FIG. 6 is another elevational side view illustrating the left side of the load balancing descending device, constructed in accordance with the present invention.
Figure 7:
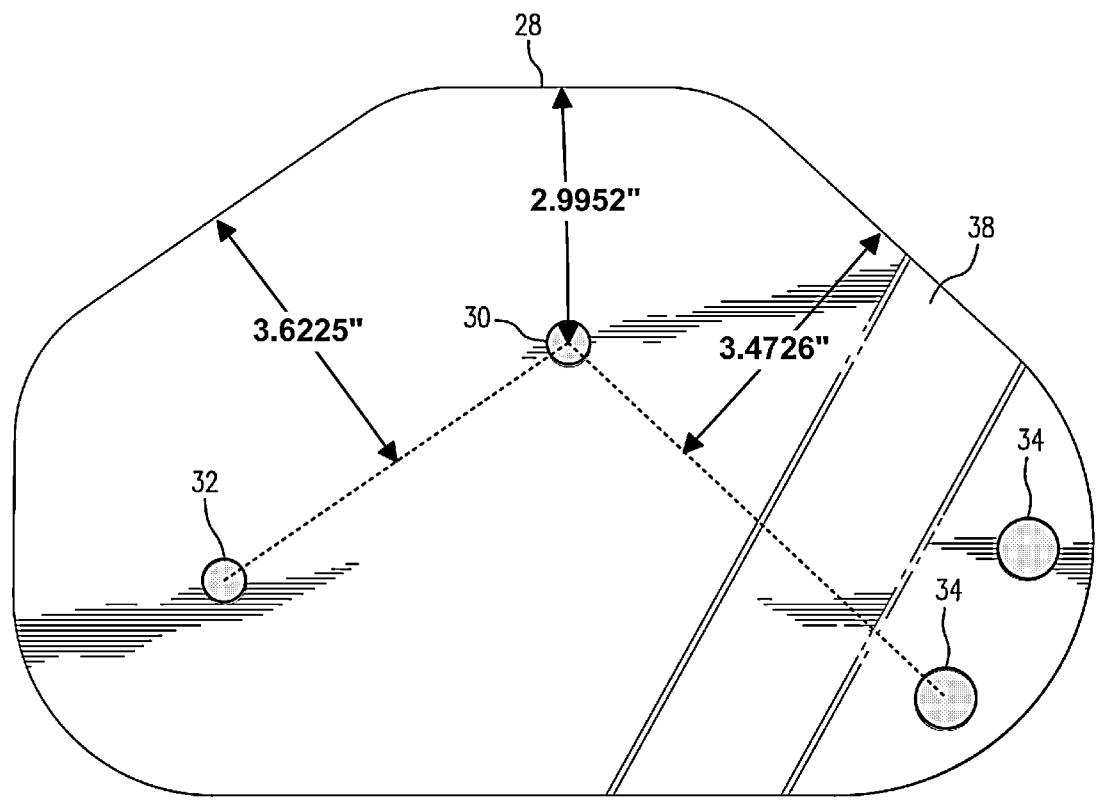
FIG. 7 is still another elevational side view illustrating the left side of the load balancing descending device, constructed in accordance with the present invention.
Figure 8:
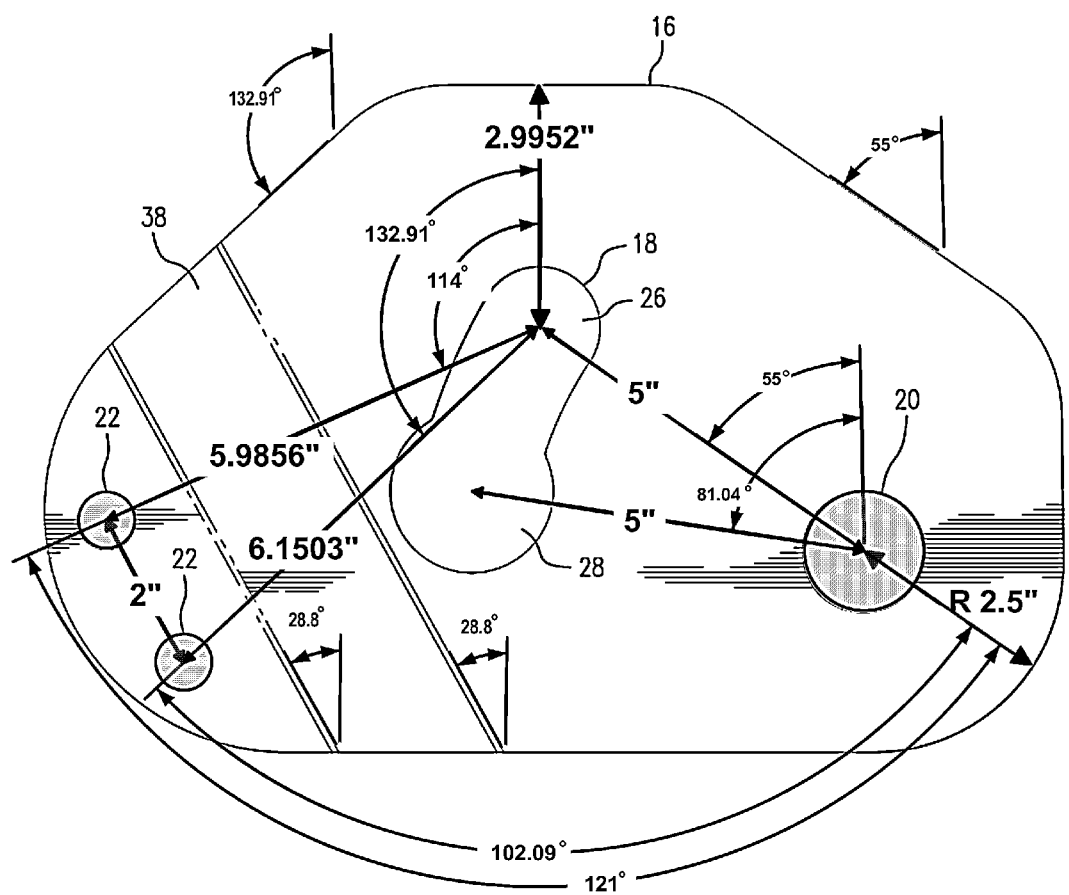
FIG. 8 is an elevational side view illustrating the right side of the load balancing descending device, constructed in accordance with the present invention.
Figure 9:
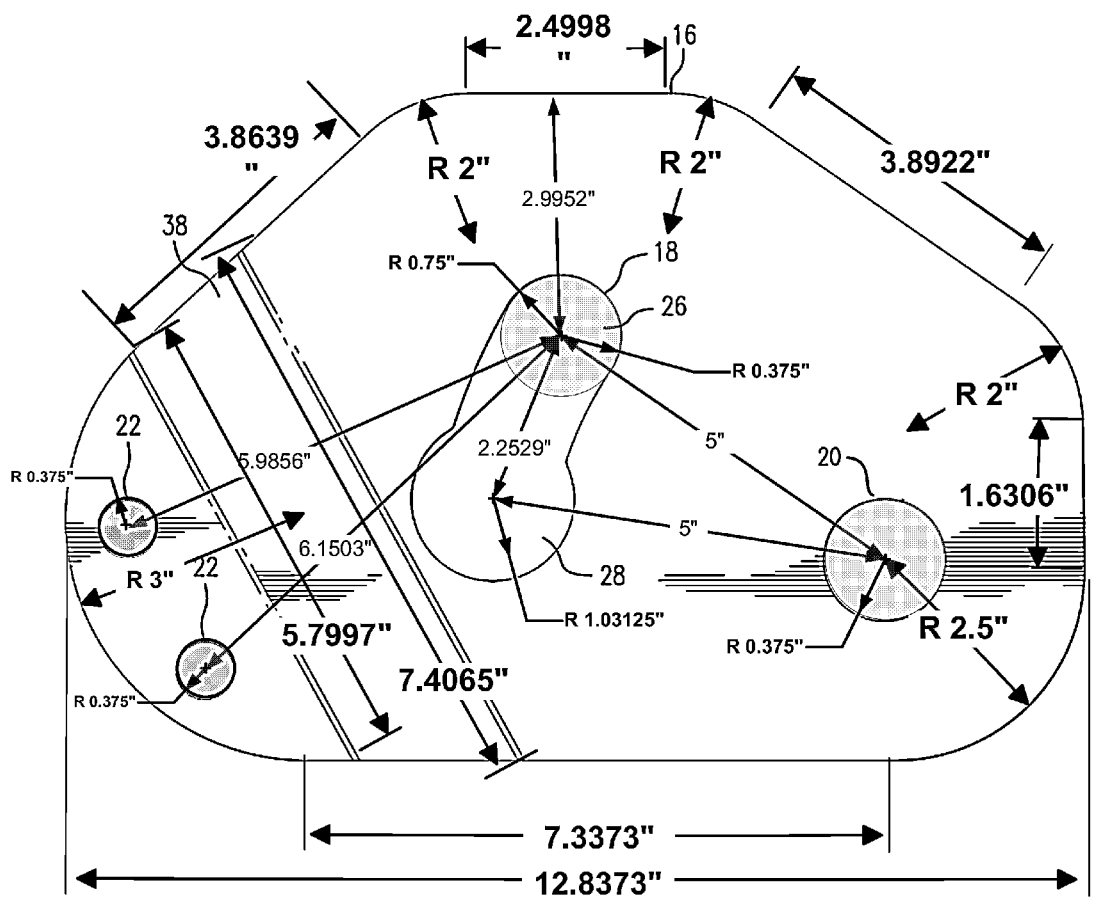
FIG. 9 is another elevational side view illustrating the right side of the load balancing descending device, constructed in accordance with the present invention.
Figure 10:
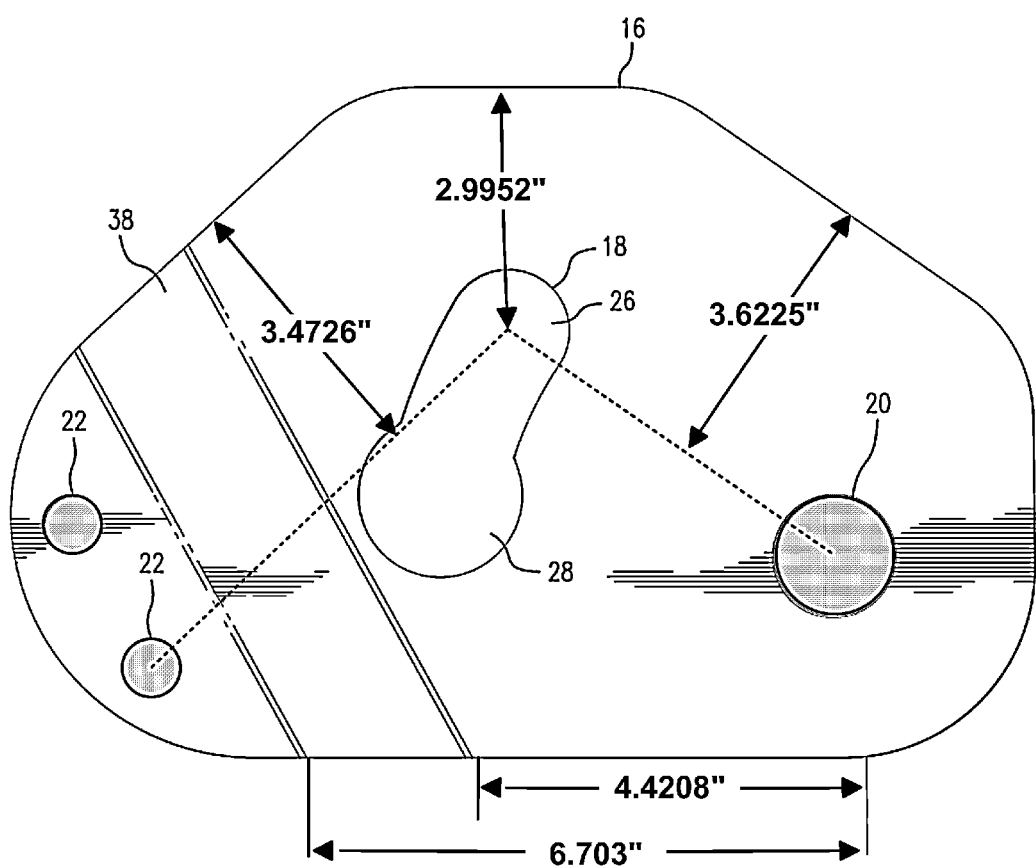
FIG. 10 is still another elevational side view illustrating the right side of the load balancing descending device, constructed in accordance with the present invention.

As illustrated in FIGS. 2 and 3, the load balancing descending device 10 of the present invention includes a swivel plate 16 having a substantially key-shaped slotted aperture 18, a substantially round aperture 20, and a plurality of carabiner receiving apertures 22. The slotted aperture includes a wide portion 24 and a narrow portion 26. The load balancing descending device 10 further includes a base plate 28 having a first substantially round aperture 30, a second substantially round aperture 32, and a plurality of carabiner receiving apertures 34. A carabiner 36 is receivable within either of the carabiner receiving apertures 22, 34 formed in both the swivel plate 16 and the base plate 28.

As illustrated in FIGS. 5-12, in an embodiment of the load balancing descending device 10 of the present invention, the swivel plate 16 and the base plate 28 have an angled portion 38. The angled portion 38 allows the portion of the swivel plate 16 and base plate 28 about the carabiner receiving apertures 22, 34 to contact each other when assembled together, as will be discussed in further detail below.

Figure 12:
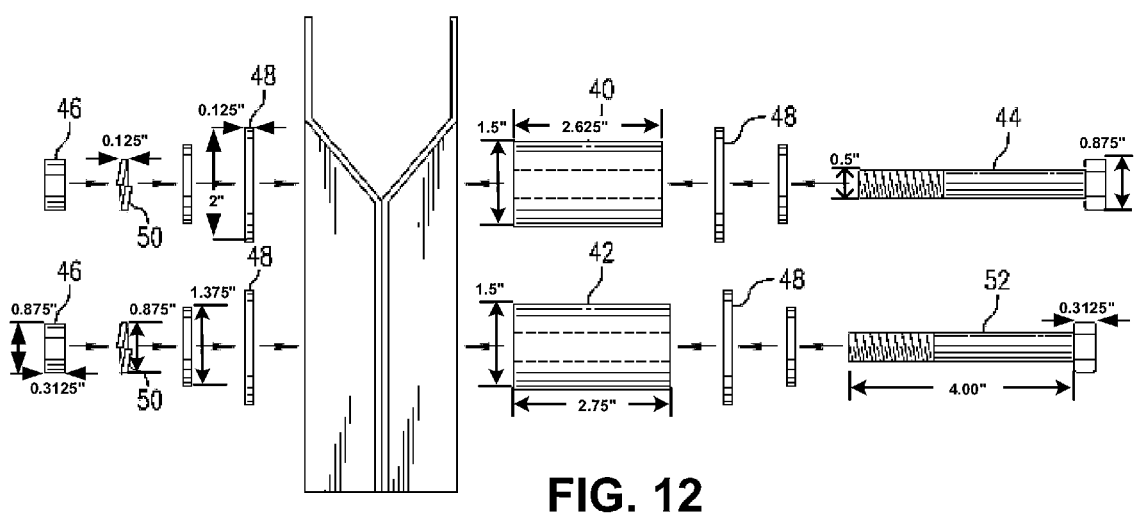
FIG. 12 is an exploded view illustrating the load balancing descending device, constructed in accordance with the present invention.
Figure 13:
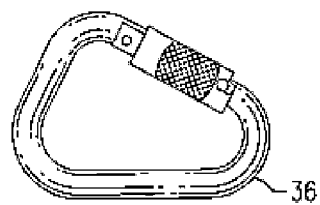
FIG. 13 is an elevational side view illustrating a carabiner for use with the load balancing descending device, constructed in accordance with the present invention.

As best illustrated in FIG. 12, the load balancing descending device 10 of the present invention further includes a first dowel 40 positionable between the swivel plate 16 and the base plate 28 and a second dowel 42 positionable between swivel plate 16 and the base plate 28. The first dowel 40 and the second dowel 42 are preferably constructed from aviation grade aluminum (2023 T-3) although constructing the first dowel 40 and the second dowel 42 from other rigid, durable materials is within the scope of the present invention.

A first bolt 44 extends through the round aperture 20 on the swivel plate 16, the first dowel 40, and the first round aperture 30 of the base plate 28. The first bolt 44 is secured in place by a nut 46 or the like. Washers 48 and lock washers 50 further maintain the position of the first bolt 44 to the swivel plate 16 and the base plate 28. The connection between the swivel plate 16 and the base plate 28 through the first bolt 44 allows the swivel plate 16 to rotate relative to the base plate 28 and the base plate 28 to rotate relative to the swivel plate 16.

A second bolt 52 extends through the slotted aperture 18 on the swivel plate 16, the second dowel 42, and the second round aperture 32 of the base plate 28. The second bolt 52, similar to the first bolt 44, is secured in place by a nut 46 or the like. Washers 48 and lock washers 50 further maintain the position of the second bolt 52 to the swivel plate 16 and the base plate 28. During use, the second bolt 52 travels from the wide portion 24 of the slotted aperture 18 to the narrow portion 26 of the slotted aperture 26 of the swivel plate 16, being releasably retained therein, as will be described in detail below.

Preferably, the first bolt 44 and the second bolt 52 have a length of approximately four (4") inches although having a bolt with length greater than or less than approximately four (4") inches is within the scope of the present invention.

Figure 1:
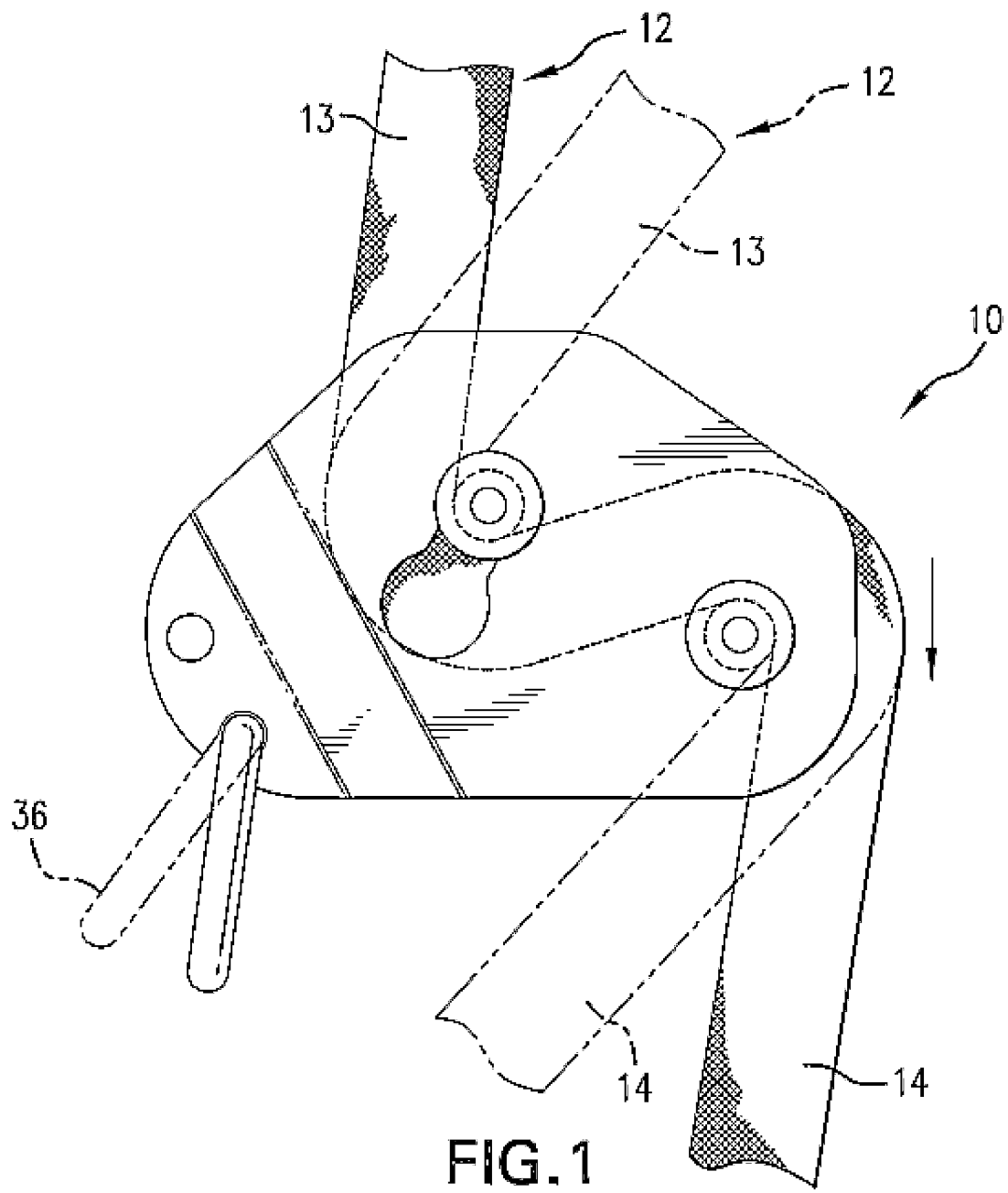
FIG. 1 is a sectional side view illustrating a load balancing descending device, constructed in accordance with the present invention.

In operation of the load balancing descending device 10 of the present invention, the carabiner 36 is removed from the carabiner apertures 22, 34 and the load balancing descending device 10 is constructed using the first and second dowels 40, 42, first and second bolts 44, 52, washers 48, and lock washers 50, as described above. The swivel plate 16 is then rotated relative to the base plate 28 exposing the first bolt 44 and the second bolt 52. Next, the rope 12 is positioned about the first bolt 44 and the second bolt 52, as best illustrated in FIGS. 1 and 2. The swivel plate 16 is then rotated until the second bolt 52 is received within the wide portion 24 of the slotted aperture 18. The swivel plate 16 is rotated a little further until the second bolt 52 is received within the narrow portion 26 of the slotted aperture 18. Finally, the carabiner 36 is inserted into and releasably secured within the carabiner receiving apertures 22, 34.

The load balancing descending device 10 of the present invention allows a rapid, controlled descent of a user. As illustrated in FIG. 1, as the user descends down the rope 12, the rope tail 14 decreases in length weight thereby causing the load balancing descending device 10 to automatically rotate impeding the movement of the rope 12 about the first and second bolts 44, 52 and creating greater friction between the first and second bolts 44, 52 and the rope 12. Therefore, as the user approaches the ground or other landing area, the user's rate of descent will slow thereby allowing a safe, controlled landing.

In sum, the load balancing descending device 10 of the present invention automatically adjusts the amount of friction applied to the rope based on the combined weight of the soldier and his load. The load balancing descending device 10 automatically balances the weight of the soldier and his load against the weight of the free end of the rope in order to maintain a controlled rate of descent. Furthermore, the load balancing descending device is easy to engage and disengage and allows a user to control the rate of descent with one hand.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A descending device for passively slowing a rate of descent of a load descending down a length of a rope, comprising:
    a base plate;
    a swivel plate;
    first and second parallel pins, of the first and second parallel pins being secured at a respective first end thereof to the base plate such that the first and second parallel pins are immovable with respect to the base plate when the device is assembled;
    first and second carabiner receiving apertures located at first respective ends of the base plate and swivel plate away from the first and second parallel pins, both of the first and second carabiner receiving apertures for receiving a same carabiner therethough;
    wherein a distance between the first and second carabiner receiving apertures and the first pin is substantially different from a distance between the first and second carabiner receiving apertures and the second pin,
    wherein both of the first and second parallel pins secure the swivel plate to the base plate when the device is assembled, when the rope is serpentinely wrapped about respective rope-contacting portions of the first and second parallel pins, and when the load is attached to the same carabiner, and
    wherein the respective rope-contacting portions of the first and second parallel pins are non-rotable with respect to the base plate.

2. The descending device of claim 1, wherein the first parallel pin is located at a second end of the device opposite to the first respective ends, the first pin joining the swivel plate and the base plate at the second end of the device to allow the swivel plate to pivot about the first pin for assembly and disassembly of the device.

3. The descending device of claim 2, wherein the swivel plate further comprises a key-shaped slotted aperture for receiving the second parallel pin.

4. The descending device of claim 1, further comprising:
    a third carabiner receiving aperture located at the first end of the base plate at a location different from a location of the first carabiner receiving aperture; and
    a fourth carabiner receiving aperture located at the first end of the swivel plate at a location different from a location of the second carabiner receiving aperture,
    wherein the first carabiner receiving aperture generally aligns with the second carabiner receiving aperture when the device is assembled, and
    wherein the third carabiner receiving aperture generally aligns with the fourth carabiner receiving aperture when the device is assembled.

5. The descending device of claim 4, wherein the distance between the first and second carabiner receiving apertures and the second pin is less than a distance between the third and fourth carabiner receiving apertures and the second pin.

6. The descending device of claim 1, wherein the first and second pins comprise first and second bolts, respectively, the first and second bolts being fixedly secured to the base plate by first and second respective nuts.

7. A method of using the descending device of claim 1, the method comprising a step of passively slowing the descent of a load attached to the device by friction generated by movement of the rope-contacting portions against the rope, and by balancing a weight of the load attached to the carabiner against a weight of a free end of the rope exiting the second end of the device opposite to the carabiner.

* * * * *